United States Patent [19]

Budecker et al.

[11] 4,084,604

[45] Apr. 18, 1978

[54] PRESSURE RESPONSIVE DISTRIBUTING VALVE

[75] Inventors: Ludwig Budecker, Frankfurt; Klaus Winter, Schwalbach, both of Germany

[73] Assignee: ITT Industries, Incorporated, New York, N.Y.

[21] Appl. No.: 722,446

[22] Filed: Sep. 13, 1976

[51] Int. Cl.[2] .......... G05D 15/00

[52] U.S. Cl. .......... 137/101; 137/115; 137/118

[58] Field of Search .......... 137/101, 115, 116, 118; 60/422

[56] References Cited

U.S. PATENT DOCUMENTS

| | | | |
|---|---|---|---|
| 3,570,519 | 3/1971 | Bianchetta | 137/101 |
| 3,692,039 | 9/1972 | Ewald et al. | 137/118 |
| 3,834,162 | 9/1974 | Keady | 137/118 |
| 3,915,186 | 10/1975 | Thomas | 137/101 |
| 4,016,895 | 4/1977 | Budecker | 137/101 |

*Primary Examiner*—William R. Cline

*Attorney, Agent, or Firm*—John T. O'Halloran; Thomas M. Marshall

[57] ABSTRACT

A pressure responsive valve for distributing the fluid under pressure delivered by a fluid pressure source to two user components, one of which is connected to an accumulator. The device includes a control valve which is disposed in a line connecting the fluid pressure source with a first user component and governs the cross-section of the passage in that line. The control valve has a control chamber and cross-section reducing member when the control chamber is in communication with the fluid pressure source. When the control chamber communicates with the return line the cross-sectional area of the passage increases. In addition a pilot and/or stop valve is included which changes its position depending upon the pressure existing in the line connecting the fluid pressure source with the second user component. The pilot/stop valve provides for communication between the control chamber and the fluid pressure source below a predetermined switching pressure at the second user component and connects the control chamber with the return line when the switching pressure is exceeded and interrupts the connection from the source to the second user component until the pressure at the second user component drops below the switching pressure.

15 Claims, 2 Drawing Figures

PRESSURE RESPONSIVE DISTRIBUTING VALVE

BACKGROUND OF THE INVENTION

1. Field of the Invention

Pressure responsive distributing valves.

2. Prior Art

Conventionally, accumulator charging valves are used in systems where a first and second user component are employed. Conventionally the second user component, for example a vehicular hydraulic brake system, is provided with a pressure accumulator. Normally, the first user component is a hydraulic power steering system for an automotive vehicle. When the conventional system uses an accumulator for supplying the brake system as part of a second user component and a power steering unit as the first unit component, reasons of safety require that the second user component have priority over the first user component with regard to the supply of pressure fluid.

From German unexamined and printed application DT-OS No. 2,364,413, it is known to provide an accumulator charging valve for distributing the fluid under pressure delivered by a fluid pressure source to two user components connecting with an accumulator. Leading from the fluid pressure source, a fluid line leads through a check valve to the user port which connects with the accumulator. Another fluid line leads through a pilot valve which changes its position in response to the accumulator pressure present in a control chamber of a control valve which permits control of the cross-sectional area of the passage through the line connecting the fluid source with another user component. The control valve comprises a control piston, one end of which projects into the control chamber and the other end thereof is directed towards the line leading from the fluid pressure source. The cross-section of the area of the passage of a line branching off from this connecting line and leading to a user component can be adjusted by the control piston. A pressure spring which is disposed in the control chamber acts on the control piston in the direction so as to close the control valve.

In the known system the accumulator pressure responsive pilot valve changes its position when the pressure in the accumulator reaches and exceeds a predetermined pressure thereby shutting off the line connecting the fluid source to the control chamber. At the same time the pilot valve opens a line between the control chamber and a return line so that the control piston, upon which the pressure from the fluid source was acting, is relieved. In order that a pressure differential be generated on either side of the control piston of the pilot valve when the control chamber communicates with the fluid pressure source, a throttle is disposed in the line connecting the fluid pressure source with the control chamber. In the known accumulator charging valve, which first supplies the accumulator, even when the accumulator reaches a predetermined charging pressure, has the disadvantage that with the accumulator fully charged and the fluid flow from the pressure source switching over to the user component supplied through the control valve, the pressure increase occurring at the user port and exceeding the pressure level of the pressure source and the accumulator causes the fluid under high pressure to act on the accumulator. This has resulted in damage to the accumulator which is only adapted to receive a pressure corresponding to the switching pressure of the pilot valve.

One of the desired goals of the pressure-responsive valve is to overcome the disadvantage of the system above described as illustrated in German unexamined and printed application DT-OS No. 2,364,413, by preventing the pressure from exceeding a predetermined level at the second user component when the pressure at the first user component exceeds the predetermined pressure level and which, at the same time, supplies the second user component prior to the first user component when the pressure by the second user component falls below a predetermined level. This result is known from German examined and printed application DT-AS No. 2,003,554 which illustrates a regulating valve which communicates with a pump and feeds fluid under pressure to a first and second user component. An accumulator is disposed in the line connecting the regulating valve to the second user component. The connecting line from the pump terminates in a chamber of a control valve with lines leading off from the chamber to the first and second user components. Displaceably arranged in the chamber is a piston with the pressure from the pump being applied to one fluid end. The opposite fluid end of the piston is acted on by a pressure spring supporting itself against the bottom of the chamber which rests against the piston. In addition, a reduced pressure, as compared to the pressure of the fluid from the pump, acts on the fluid end, which pressure results from a connection of both piston fluid ends through a throttle in the piston.

In the system of German examined and printed publication DT-AS No. 2,003,554, the lines connecting with the first and second components terminate in the chamber of the control valve in such a way that, in the end position of the piston in the direction towards where the line which comes from the pump terminates, in the chamber, the line connected with the first user component is closed and the line in communication with the second user component is connected to the reduced pressure area of the chamber. When the piston is displaced against the reduced pressure and the pressure exerted by the spring, a connection will be established between the first user component and the area of the control valve chamber which is subjected to the pressure of the fluid from the pump. At this point the connecting line between the reduced area control valve chamber and the second user component will be shut off. At the same time a piston closes a further line leading from the reduced pressure area to a return line through a pilot valve. The pilot valve changes its position in response to the pressure prevailing at the second user component thus opening its passage to the flow of fluid when the second user component has reached a predetermined switching pressure thereby connecting the reduced pressure area of the control valve chamber with the return line and relieving it from pressure. This produces a result in which the displacement of the piston in its end position into the reduced pressure area of the control valve chamber closes the line connecting with the second user component and opens the line connecting with the first user component. By that device the pressure at the first user component, which is higher than the switching pressure of the pilot valve, is not capable of acting on the second user component and consequently on the accumulator. Thus the regulating valve described in German examined and printed Application DT-AS No. 2,003,554 fails to accomplish the desired results.

SUMMARY OF THE INVENTION

It is the object of this invention to provide a pressure responsive valve for distributing the fluid under pressure delivered by a source of fluid under pressure to two user components, one of which is connected with an accumulator, which includes a control valve disposed in a first line connecting the fluid pressure source with a first user component and which governs the cross sectional area of the flow passage in that first line. The control valve has a first line and operates to reduce the cross sectional area of the passage while the control chamber is in communication with the source of fluid under pressure but increases the cross sectional area of the flow through the control chamber when the control chamber is in communication with the return line. The device further includes a pilot valve which changes its position depending upon the pressure existing in a second line connecting the fluid pressure source with the second user component, the pilot valve providing for communication between the control chamber and the fluid pressure source through a separate line below a predetermined switching pressure and connecting the control chamber with a return line when the switching pressure is exceeded.

In the device of this invention the object is achieved by providing for closing the line connecting the fluid pressure source with the second user component by means of a stop valve associated with the second line which closes when the control chamber is in communication with the return line. In the preferred device of this invention the closure member means of the stop valve is advantageously adapted to be operated in the opening direction by the pressure provided by the fluid pressure source. The closure member means of the stop valve may be a movable valve spool slidably arranged in a cylinder and acted on in the closing direction by the pressure of the fluid pressure source. In this device one end of the stop valve closure member means is acted on in the opening direction and is preferably connected with the control chamber. The connection between the control chamber and the end face of the stop valve closure member means may lead through the pilot valve. In order to reduce the number of fluid channels and valves, one form of the device of this invention provides for branching off of the line connecting the second user component with the control chamber and for using the pilot valve as the stop valve. In one simple embodiment of this invention the pilot valve is a dual seat valve, the control member of which is arranged so as to close off the line connecting the fluid pressure source with the control chamber or the control chamber with the return line. The closure member of the dual seat valve may be the same as the control member of the pilot valve.

In an advantageous embodiment of this invention the closure member of the dual seat valve may be a ball disposed in a valve chamber, and the valve seats may be formed by the openings for the line coming from the fluid pressure source and for the return line terminating into the valve chamber, with the closure chamber being positioned within the valve chamber.

The pilot valve may have a switching piston which is subjected to the pressure existing at the second user component, against the pressure force of a spring and the force of the pressure from the fluid pressure source which acts on the closure member, and which, by overcoming the spring force and the force acting on the closure member, causes the closure member to be lifted off the valve seat formed between the return line opening and to be pressed onto the valve seat formed by the opening of the line leading from the fluid pressure source.

If the effective cross sectional area of the valve seat formed by the line coming from the fluid pressure source which is acted on by the fluid under pressure is substantially smaller than the effective area of the switching piston which is acted on by the fluid under pressure, a closing force advantageously acts on the closure member keeping the closure member in engagement with the valve seat formed by the opening of the line connecting the source of fluid pressure with the valve chamber of the pilot valve even if pressure existing at the first user component is substantially higher than at the second user component.

In a further advantageous embodiment of the device of this invention the closure member of the control valve includes a second area which is adapted to be acted on in the closing direction by pressure existing at the first user component, with the closure member being acted on in the opening direction by the pressure from the fluid pressure source. In this embodiment it will be an advantage if the area of the closure member acted on in the opening direction is either equal to or smaller than its area which is acted on in the closing direction. This design has the advantage that the control valve will close when the pressure at the first user component is higher than the pressure from the fluid source thereby preventing the higher pressure from reaching the fluid pressure source and overloading it.

In still a further advantageous embodiment, the closure member of such a control valve comprises two parts with the first part being formed by the valve closure body which includes a surface acted on in the opening direction as well as a second surface acted on in the closing direction, with the second part being a valve spool acted on in the closing direction by the pressure from the fluid pressure source. In this device the spool is advantageously exposed to the pressure existing at the first user component in the opening direction. In order to hold the spool in abutment with the valve closure body by means of the pressure of the fluid pressure source, if no pressure acts in the closing direction, a pressure spring is provided which exerts a small force on the spool in the closing direction.

A still further advantageous embodiment of this invention provides for an arrangement of a throttle in the common line section connecting the fluid pressure source with the pilot valve and with the second user component. By designing the control valve with a bypass piston operating as a closure member spring loaded in the closing direction and acted on in the opening direction by the pressure from the fluid pressure source, the pressure differential generated by the throttle in the control chamber will act on the bypass piston in the closing direction and cause it to assume a position in which there is a constant flow of fluid at the first user component. In addition, the throttle permits a steady supply of fluid under pressure to the second user component which is free from pressure surges. In this embodiment the throttle is provided in a simple design and arrangement by providing that the cross sectional area of the valve seat is designed as a throttle at the opening of the line connecting the fluid pressure source with the valve chamber of the pilot valve.

DESCRIPTION OF THE PREFERRED EMBODIMENT

Figure 1:
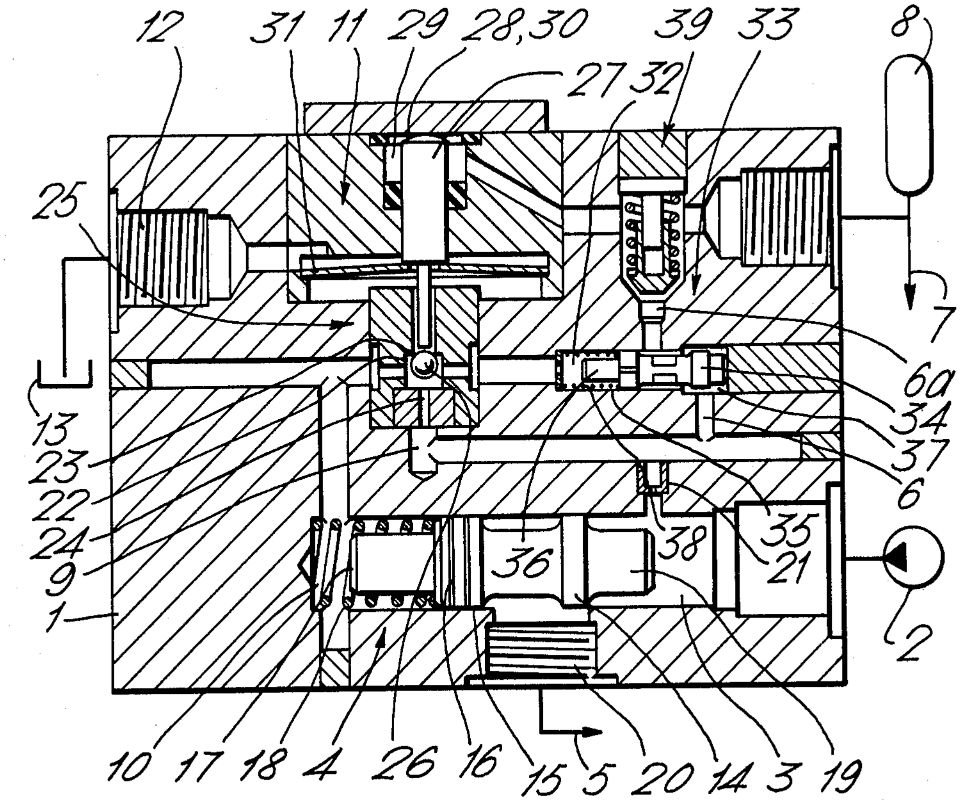
FIG. 1 is a cross sectional view of an embodiment of a pressure responsive valve constructed in accordance with this invention.

The valve housing 1 includes a line 3 which leads from a fluid pressure source 2 through a control valve 4 to a first user component connection 5. Another line 6 connects the fluid pressure source 2 with a second user component connecting line 7 and an accumulator 8. From fluid pressure source 2 a third line 9 connects with the control chamber 10 of the control valve 4, with a pilot valve 11 disposed in line 9 providing for communication of the control chamber 10 with the fluid pressure source 2 in one valve position, and, through a return line 12 with an unpressurized reservoir 13 when the control valve 4 is in its other position. The control valve 4 of FIG. 1 has a closure member 14 including a piston 16 which is slidable in a cylindrical bore 15 with that part of the cylindrical bore 15 into which the front end 17 of piston 16 projects into control chamber 10. Front end 17 of piston 16 is acted on by a pressure spring 18 positioned against the bottom of control chamber 10 and the front end 17 of piston 16. The front end 17 of piston 16 is also acted on by pressure from the fluid pressure source 2 in the closing direction of control valve 4 when control chamber 10 is in communication with the fluid pressure source 2. The other end 19 of piston 16 which is opposite the front end 17 of piston 16 is always exposed to the pressure of the fluid pressure source 2 in the opening direction of control valve 4. From the cylindrical bore 15, in the area of piston 16, a line 20 branches off to the first user component connection 5. Since a throttle 21 is disposed in lines 6, 9 leading from fluid pressure source 2 to control chamber 10 and since the acted upon surfaces of ends 17 and 19 of piston 16 are equal, the pressure differential generated by throttle 21 on either side of piston 16 causes the cross sectional area of the passage of control valve 4 to be opened by a predetermined constant amount when the passage from the fluid pressure source 2 to control chamber 10 is open. When the passage from fluid pressure source 2 to control chamber 10 is closed, the pressure from fluid pressure source 2 acts on the end 19 of piston 16 whereupon the control chamber 10 communicates with return line 12 and is relieved from pressure thereby causing piston 16 to be displaced in the opening direction against the force of pressure spring 18 and the cross sectional area of fluid passage of control valve 4 is caused to be fully opened.

Pilot valve 11 includes a chamber 22 into which the return line 12 and, opposite thereto, a line 9 coming from fluid pressure source 2 terminate. These ports opening into valve chamber 22 are designed as valve seats 23, 24 of a dual seat valve 25, the closure member of which is ball 26. Closure member 26, which via line 9 is always exposed to the pressure from fluid pressure source 2 in the sense of opening the passage between the fluid source 2 and the control chamber 10 and thereby in the sense of closing the connection between the control chamber 10 and the return line 12, is adapted to be lifted off of valve seat 23 of return line 12 by a means of a switching piston 27 and to be urged into engagement of valve seat 24 of line 9 connecting with fluid source 2. The front end 28 of switch piston 27 which is opposite the dual seat valve 25 projects into a chamber 29 which communicates with the second user component 7 thereby causing the pressure at the second user component 7 to act on the front end 28 in its capacity as an effectively acted on surface 30 of switching piston 27, this in the sense of lifting closure member 26 off of valve seat 23 for engagement with the valve seat 24. Counteracting the movement of switch piston 27 is a pressure spring 31 so that such a switching operation can be performed only after the force of pressure spring 31 and the pressure from fluid source 2 which acts on the closure member have been overcome. The cross-sectional area of the valve seat 24 is substantially smaller than the effective acted on surface 30 of switching piston 27 so that the closure member or ball 26 cannot be lifted off of valve seat 24 by increase of the pressure occurring in line 9 when switching piston 27 is exposed to a predetermined pressure corresponding to the maximum valving pressure of accumulator 8.

Further, valve chamber 22 is permanently in communication with control chamber 10 of control valve 4 as well as cylindrical chamber 32 of a stop valve 33 which permits the closing of line 6 connecting the fluid pressure source 2 with the second user component. The closure member 34 of stop valve 33 is a valve spool slidably arranged in cylinder 35, one front end 36 of which projects into cylinder chamber 32 while the other end projects into chamber 37 in which line 6 terminates. In the area of the valve spool, a second line section 6*a* branches off from cylinder 35 and leads to the second user component 7. When the valve spool is displaced into chamber 27 up to its end position, stop valve 33 provides free passage from a line 6 to the second line section 6*a* and to the second user component 7 and when the valve spool is disposed in the cylinder chamber 32 up to its end position stop valve 33 will be closed. A spring 38 disposed in cylinder chamber 32 acts on the valve spool in the opening direction. In addition, line section 6*a* includes a check valve 39 inhibiting the fluid in the direction of flow from the pressure source 2 to the second user component 7.

Below a predetermined switching pressure at the second user component 7, pilot valve 11 provides free passage of fluid from the fluid pressure source 2 to the control chamber 10 and stop valve 33 opens the passage between the fluid pressure source 2 and the second user component 7 thereby delivering fluid flow to the latter and supplying only a small constant flow of fluid to the first user component 5 through control valve 4. When the switching pressure is reached, pilot valve 11 changes its position closing off line 3 which connects the fluid pressure source 2 with the control chamber 10 and connecting instead control chamber 10 and cylinder chamber 32 with an unpressurized return line 12. This causes control valve 4 and stop valve 37 to change their positions, i.e., control valve 4 opens fully its passageway to the first user component and stop valve 33 closes off its passageway to the second user component. Only when the pressure existing at the second user component drops will pilot valve 11, and consequently control valve 4 and stop valve 33, change their position again. When the switching pressure is reached and pilot valve 11 has changed its position, even pressure surges and an increase of pressure at the first user component 5 will not be in a position to lift the valve closure means or ball 26 off valve seat 24 to thereby cause switching of the position of stop valve 33 and consequently further pressure fluid supply to the second user component 7.

Figure 2:
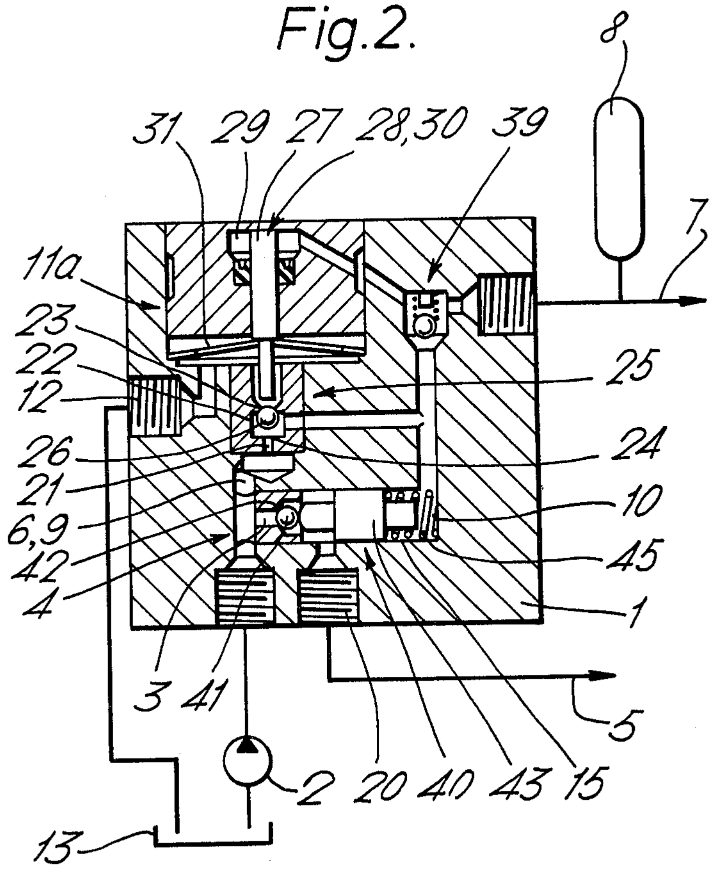
FIG. 2 shows a second embodiment of a pressure responsive distributing valve constructed in accordance with this invention.

The structure of pilot valve 11*a* illustrated in FIG. 2 corresponds to pilot valve 11 of FIG. 1 as far as structure and operating characteristics are concerned. Since lines 6 and 9 are designed as one and lead through valve chamber 22 to the second user component 7 and to control chamber 10 of control valve 4, pilot valve 11*a* assumes at the same time the functions of both pilot valve 11 and stop valve 33 of the embodiment illustrated in FIG. 1. In this device, the cross-section of valve seat 24 of pilot valve 11*a* is designed as a throttle 21. In a manner similar to FIG. 1, FIG. 2 also shows a check valve 39 disposed in a line 6*a* leading to second user component 7 and inhibiting flow against the direction of the flow.

Closure member 40 of control valve 4 in FIG. 2 includes two parts: A valve spool 43 slidably disposed in a cylindrical bore 15 urges a valve closure member 41, formed by a ball, against a valve seat 42 in opposition to the direction of flow from the fluid pressure source 2 of the first user component 5. The end face of valve spool 43, which is opposite valve closure member 41, projects into control chamber 10 and is acted on by the fluid under pressure from fluid pressure source 2 if the connection with the fluid pressure source 2 remains open. From cylinder bore 15 in the area of valve closure member 41 and the valve spool 43, a line 3*a* connects with first user component 5.

If in the open state of control valve 4 the pressure existing at first user component 5 exceeds the pressure at line 6, this high pressure acts on closure member 41 urging it onto valve seat 42. Further this pressure acts on the end of valve spool 43 facing the valve closure member 41 displacing it into the control chamber 10 against the source of pressure 45 disposed in control chamber 10 and acting on valve spool 43. However, due to the fact that the closure member 41 is formed of two parts the pressure existing at the first user component 5 is not in a position to cause an opening movement of the control valve so that also when there is a high pressure increase at the first user component, the pump serving as the fluid pressure source 2 cannot be overloaded. Pressure spring 45 which acts on valve spool 43 in the closing direction only provides a small force and serves to keep the valve spool 43 in abutment with valve closure member 41 when the first user component 5 is unpressurized.

A particular advantage of the valve constructed in accordance with this invention is that in no position is pressure fluid allowed to flow directly to an unpressurized return line but that the whole fluid flow delivered by the fluid source is fed to the first user and second user components.

While two illustrative embodiments have been described, it will be appreciated that changes may be made that will not depart from the spirit and scope of the appended claims.

What is claimed is:

1. A pressure responsive distributing valve means for distributing fluid under pressure delivered by a source of fluid pressure from an inlet port portion to outlet port portions for at least first and second user components, through at least first and second lines, one of said user components having an accumulator associated therewith, said distributing valve means including:

a control valve means disposed in said first line connecting said source of fluid pressure with said first user component, said control valve governing the cross-sectional area of the passageway provided by said first line, said control valve including a control chamber and means for reducing the cross-sectional area of the flow of fluid through said first line when said control chamber is in communication with said source through a separate line and for increasing said cross-sectional area when said control chamber is in communication with a return line;

a dual seat pilot and/or stop valve means whose position is dependent upon the pressure at said second user component including pilot valve dual seat closure means in a valve chamber, said pilot and/or stop valve means connecting said source to said control chamber for providing communication through said separate line between said control chamber and said source below a predetermined switching pressure existing at said second user component when said pilot and/or stop valve closure means is in a first position and for connecting said control chamber with said return line when said switching pressure is exceeded and said pilot valve closure means is in a second position; and means associated with said second line for connecting said source with a second user component when said control chamber is in communication with said return line.

2. The distributing valve means described in claim 1 further including closure member means in said pilot and/or stop valve means connected to be acted on in the opening direction by the pressure of the fluid from said source in said separate line.

3. The distributing valve means as set forth in claim 2 wherein said closure member means is a valve spool slidably arranged in a cylinder the first end surface of which is connected in said second line and is acted on in the closing direction by the pressure from said source in said second line.

4. The distributing valve means as set forth in claim 3 wherein the second end surface of said valve spool is connected with and is adapted to be acted on in the opening direction by being in communication with said control chamber by a connection between said control and in said pilot and/or stop valve through said separate line.

5. The distributing valve means as set forth in claim 1 wherein said second line is formed by a branch off of said separate line and wherein said pilot and/or stop valve is adapted to operate both as a pilot and a stop valve.

6. The distributing valve means as set forth in claim 1 wherein said closure member of said dual seat pilot and/or stop valve is a ball disposed in said valve chamber, said chamber having valve seats formed therein where each of the openings of said separate line enters from said fluid source and said return line terminates into said valve chamber, said control chamber being in communication with said valve chamber through said separate line.

7. The distributing valve means as set forth in claim 6 wherein said pilot and/or stop valve includes a switching piston, connecting means for exposing one end of said switching piston to the pressure existing at said second user component acting on said switching piston in one direction, a pressure spring acting on said switching piston in the opposite direction, said closure member acting on the opposite end of said switching piston with the force of the pressure from said source acting on said closure member, in the said opposite direction, whereby when the pressure existing at said second user component acting on said one end of said switching piston overcomes the force of said spring and the force acting on said closure member, said closure member is caused to be lifted off the valve seat formed by said opening into said valve chamber formed by said return line and is applied onto the valve seat formed by the opening into said valve chamber formed by said separate line in communication with said source.

8. The valve as set forth in claim 7 wherein the cross-sectional area of the valve seat formed by the termination of said separate line into said valve chamber is substantially smaller than the effective surface area of said one end of said switching piston.

9. The distributing valve means as set forth in claim 1 wherein said means for reducing the cross-sectional area in said first line includes a first end surface connected to be acted on in the closing direction by the pressure existing at said outlet port for said first user component and has a second end surface portion acted on in the opening direction by a connection to said source.

10. The distributing valve means as set forth in claim 9 wherein the second surface of said closure member which is acted on at the opening direction has an effective area which is equal to or smaller than the first surface of said closure member which is acted on in the closing direction.

11. The distributing valve means as set forth in claim 10 wherein said closure member element of said control valve includes two parts, the first of said parts being formed by a valve closure body connecting said second surface said first surface and the second of said two parts comprises a valve spool connected to be acted on in the closing direction by the pressure from said source.

12. The distributing valve as set forth in claim 11 including additional means connecting said valve spool to the pressure existing at the first user component port acting in the opening direction.

13. The distributing valve as set forth in claim 11 further including a pressure spring positioned to exert a small force on the valve spool in the closing direction.

14. The distributing valve as set forth in claim 1 further including throttle means in said second and separate lines.

15. The distributing valve as set forth in claim 14 wherein the cross-sectional area of said valve seat formed at the opening of said separate line into said valve chamber of said pilot and/or stop means constitutes a throttle means.

* * * * *